(12) United States Patent
Nicholas et al.

(10) Patent No.: US 7,264,644 B2
(45) Date of Patent: Sep. 4, 2007

(54) METHODS AND APPARATUSES FOR MOUNTING A FILTRATION HOUSING FOR SOLID FILTRATION MEDIA

(75) Inventors: David W. Nicholas, Roswell, GA (US); James Aaron Nicholas, Roswell, GA (US)

(73) Assignee: Purafil, Inc., Doraville, GA (US)

( * ) Notice: Subject to any disclaimer, the term of this patent is extended or adjusted under 35 U.S.C. 154(b) by 59 days.

(21) Appl. No.: 10/811,120

(22) Filed: Mar. 26, 2004

(65) Prior Publication Data

US 2005/0210847 A1 Sep. 29, 2005

(51) Int. Cl.
*B01D 46/00* (2006.01)
(52) U.S. Cl. .................. 55/502; 55/490; 55/471; 55/480; 55/481; 55/493; 55/472; 55/503; 55/385.2; 95/268; 95/286; 454/187
(58) Field of Classification Search ............ 55/471, 55/480, 481, 493, 503, 472, 502, 385.2, 490; 454/187; 95/268, 286
See application file for complete search history.

(56) References Cited

U.S. PATENT DOCUMENTS

| 3,077,259 | A |   | 2/1963  | Braun |   |
|---|---|---|---|---|---|
| 3,593,503 | A |   | 7/1971  | Andrews |   |
| 3,816,984 | A |   | 6/1974  | Neumann |   |
| 4,023,944 | A |   | 5/1977  | Beane |   |
| 6,001,145 | A | * | 12/1999 | Hammes | 55/471 |
| 6,045,600 | A | * | 4/2000  | Michaelis et al. | 55/502 |
| 6,162,272 | A | * | 12/2000 | Michaelis et al. | 55/497 |
| 6,168,647 | B1 | * | 1/2001  | Perry et al. | 95/19 |
| 6,210,458 | B1 | * | 3/2001  | Shindo et al. | 55/486 |
| 6,217,627 | B1 | * | 4/2001  | Vyskocil et al. | 55/492 |
| 6,371,846 | B1 | * | 4/2002  | Powell et al. | 454/271 |
| 6,406,509 | B1 | * | 6/2002  | Duffy | 55/492 |
| 6,540,806 | B2 | * | 4/2003  | Reinhold | 55/490 |
| 6,638,332 | B1 | * | 10/2003 | Schmitz et al. | 55/392 |
| 6,881,238 | B2 | * | 4/2005  | Marchart et al. | 55/495 |
| 2003/0070405 | A1 | * | 4/2003  | Michaelis et al. | 55/497 |
| 2004/0221555 | A1 | * | 11/2004 | Engelland et al. | 55/502 |
| 2005/0102986 | A1 | * | 5/2005  | Gosweiler | 55/502 |

OTHER PUBLICATIONS

International Search Report and the Written Opinion of the International Searching Authority, Feb. 21, 2006, Purafil, Inc.
U.S. Appl. entitled "Filter Lock System"; Inventors: Steve L. Zels and Charles Pruitt, Jul. 12, 1979.

* cited by examiner

*Primary Examiner*—Duane Smith
*Assistant Examiner*—Minh-Chau T. Pham
(74) *Attorney, Agent, or Firm*—Kilpatrick Stockton LLP (57) ABSTRACT

Methods and apparatuses for mounting a filtration housing for solid filtration media. One aspect of the invention includes a method for mounting an air circulation component to an air circulation system, wherein the air circulation component includes a center of gravity. The method includes providing a notch associated with an air circulation component wherein the notch includes a contact surface; providing a guide associated with the air circulation system, wherein the guide includes a load bearing surface; and positioning the air circulation component with respect to the air circulation system such that a portion of the contact surface is adjacent to a portion of the load bearing surface, wherein the adjacent surfaces comprise a contact angle that is substantially coplanar with a center of gravity of the air circulation component, and wherein a portion of the weight of the air circulation component transferred between the surfaces causes a sealing pressure against a portion of the air circulation system.

22 Claims, 9 Drawing Sheets

METHODS AND APPARATUSES FOR MOUNTING A FILTRATION HOUSING FOR SOLID FILTRATION MEDIA

TECHNICAL FIELD

The present invention relates generally to the field of filtration. The invention more particularly relates to methods and apparatuses for mounting a filtration housing for solid filtration media.

BACKGROUND OF THE INVENTION

Conventional air filters are installed in environments such as cleanrooms, petroleum treatment and storage areas, sewage treatment facilities, hospitals, morgues, anatomy laboratories, animal rooms, and pulp and paper production sites, among others. It is often necessary to provide a housing for holding conventional filters for cleaning air that travels through the housing to a space or mechanism downstream of the filter system. Such filters are sometimes used in conjunction with solid filtration media which adsorbs impurities and/or corrosive gases from the airstream. For example, copper and aluminum components of a compressor can be corroded by acids which are formed from sulphur or halogen compounds present in the air being compressed. This problem can be solved by passing the air traveling to the compressor though a dual filter system including a bank of modules containing solid pellets of a substrate impregnated with a permanganate, such as Purafil®-brand adsorbant medium manufactured by Purafil, Inc. and sold in pre-filled cartridges under brand names such as "PK-12," "PK-18," and "MEDIAPAK." The air can be further passed through a bank of high efficiency filters capable of removing particles from the air down to several microns in size. The high efficiency filters remove essentially all the particulate matter from the air, including any dust that may be associated with the solid media.

In some instances, conventional filters experience air leakage around the edges of the filter. Air leakage causes air or other gases to bypass the filter, thus reducing the effectiveness and efficiency of the filtration properties of the filter.

Conventional seals around the edges of the air filter can be effective at minimizing air leakage only when such seals are properly installed and maintained. However, when such an air filter is removed for maintenance and reinstalled, the conventional seals must also be properly installed otherwise such seals lose their effectiveness. Maintaining conventional seals can be time consuming and expensive.

Therefore, a need exists for improved methods and apparatuses for mounting an air circulation component to an air circulation system.

A further need exists for improved methods and apparatuses for mounting a filtration housing for solid filtration media.

A further need exists for improved methods and apparatuses for minimizing air leakage by a filtration housing for solid filtration media.

A further need exists for an apparatus for mounting to an air circulation system to reduce air leakage.

A need also exists for a solid filtration media filter that minimizes air leakage.

A need also exists for a seal that minimizes air leakage for a solid filtration media filter.

SUMMARY OF THE INVENTION

Some or all of the needs above are addressed by various embodiments of the invention described herein. One embodiment of the invention provides an air circulation component, such as a filtration housing containing a filtration media, wherein a notch is configured in a leading edge of the filtration housing. The notch cooperates with a guide associated with a portion of an air circulation system, such as a structural support to mount the filtration housing. A set of structural supports adjacent to a trailing edge of the filtration housing assist in supporting or otherwise mounting the filtration housing. When the filtration housing is mounted to the leading structural support and the set of trailing edge structural supports, the guide cooperates with the notch to support a portion of the weight of the filtration housing (and filtration media). Cooperation between the notch and guide directs a force caused by the portion of the weight towards and substantially through a center of gravity of the filtration housing. The force through the center of gravity causes the trailing edge of the filtration housing to press tightly against the trailing edge structural supports. In this manner, cooperation between the notch and guide increases sealing pressure between the trailing edge of the filtration housing and the set of trailing edge structural supports, thus reducing air leakage and air or gas bypass across the filtration housing.

One aspect of the invention comprises a method for mounting an air circulation component of an air circulation system, wherein the air circulation component comprises a center of gravity. The method includes providing a notch associated with an air circulation component, wherein the notch comprises a contact surface; providing a guide associated with the air circulation system, wherein the guide comprises a load bearing surface; and positioning the air circulation component with respect to the air circulation system such that a portion of the contact surface is adjacent to a portion of the load bearing surface, wherein the adjacent surfaces comprise a contact angle that is substantially coplanar with a center of gravity of the air circulation component, and wherein a portion of the weight of the air circulation component transferred between the surfaces causes a sealing pressure against a portion of the air circulation system.

In another aspect of the invention, an apparatus for mounting to an air circulation system is provided, where the system comprises a guide having a load bearing surface. The apparatus includes a housing, and a notch associated with the housing, wherein the notch comprises a contact surface for mounting adjacent to the load bearing surface, wherein the adjacent surface comprises a contact angle that is substantially coplanar with a center of gravity of the housing, and wherein a portion of the weight of the housing transfers between the surfaces, and causes a sealing pressure against a portion of the air circulation system.

Yet another aspect of the invention provides a method for reducing air leakage from a filtration system comprising a structural bracket and a guide with a load bearing surface. The method includes providing a notch associated with a filter, wherein the notch comprises a contact surface, positioning the filter with respect to the guide and structural bracket such that a portion of the contact surface is adjacent to a portion of the load bearing surface, wherein the adjacent surfaces comprise a contact angle that is substantially coplanar with a center of gravity of the air circulation component, and wherein a portion of the weight of the air circulation component transferred between the surfaces causes the filter to generate a sealing pressure against an adjacent structural bracket associated with the filtration system.

Accordingly, it is an object of the present invention to provide improved methods and apparatuses for mounting an air circulation component to an air circulation system so that air leakage is minimized.

It is a further object of the invention to provide improved methods and apparatuses for mounting a filtration housing for solid filtration media.

It is a further object of the invention to provide improved methods and apparatuses for minimizing air leakage by a filtration housing for solid filtration media.

It is a further object of the invention to provide an apparatus for mounting to an air circulation system to reduce air leakage.

It is a further object of the invention to provide a solid filtration media filter that minimizes air leakage.

It is a further object of the invention to provide a seal that minimizes air leakage for a solid filtration media filter.

These and other objects, features and advantages of the present invention will become apparent after a review of the following detailed description of the disclosed embodiments and the appended claims.

DETAILED DESCRIPTION OF EMBODIMENTS

Embodiments of the invention are designed to operate in an air or gas circulation system with an air or gas flow. One embodiment of the invention provides an air circulation component, such as a filtration housing containing a filtration media, wherein a notch is configured in a leading edge of the filtration housing. The notch cooperates with a guide associated with a portion of an air circulation system, such as a structural support to mount the filtration housing. A set of structural supports adjacent to a trailing edge of the filtration housing assist in supporting or otherwise mounting the filtration housing. When the filtration housing is mounted to the leading structural support and the set of trailing edge structural supports, the guide cooperates with the notch to support a portion of the weight of the filtration housing (and filtration media). Cooperation between the notch and guide directs a force caused by the portion of the weight towards and substantially through a center of gravity of the filtration housing. The force through the center of gravity causes the trailing edge of the filtration housing to press tightly against the trailing edge structural supports. In this manner, cooperation between the notch and guide increases sealing pressure between the trailing edge of the filtration housing and the set of trailing edge structural supports, thus reducing air leakage and air or gas bypass across the filtration housing.

Figure 1:
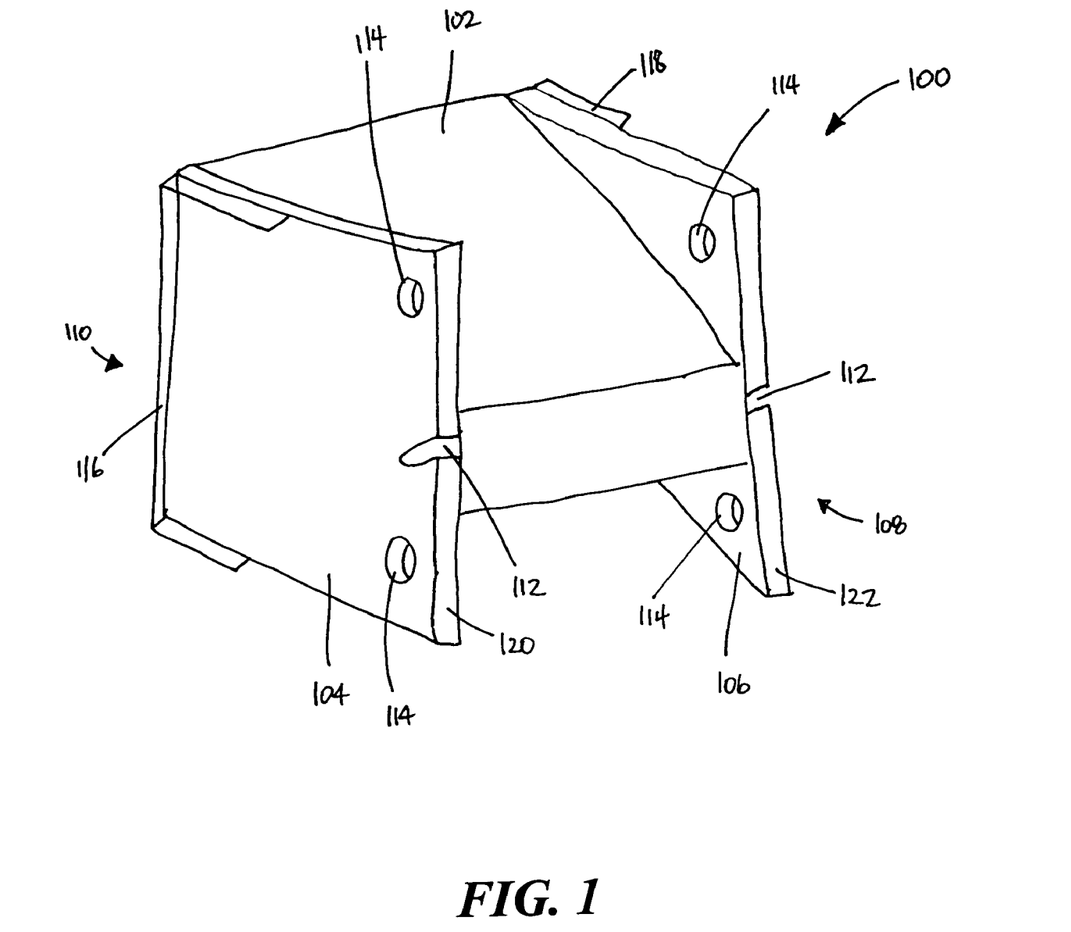
FIG. 1 is a perspective view of an exemplary apparatus in accordance with an embodiment of the invention.
Figure 2:
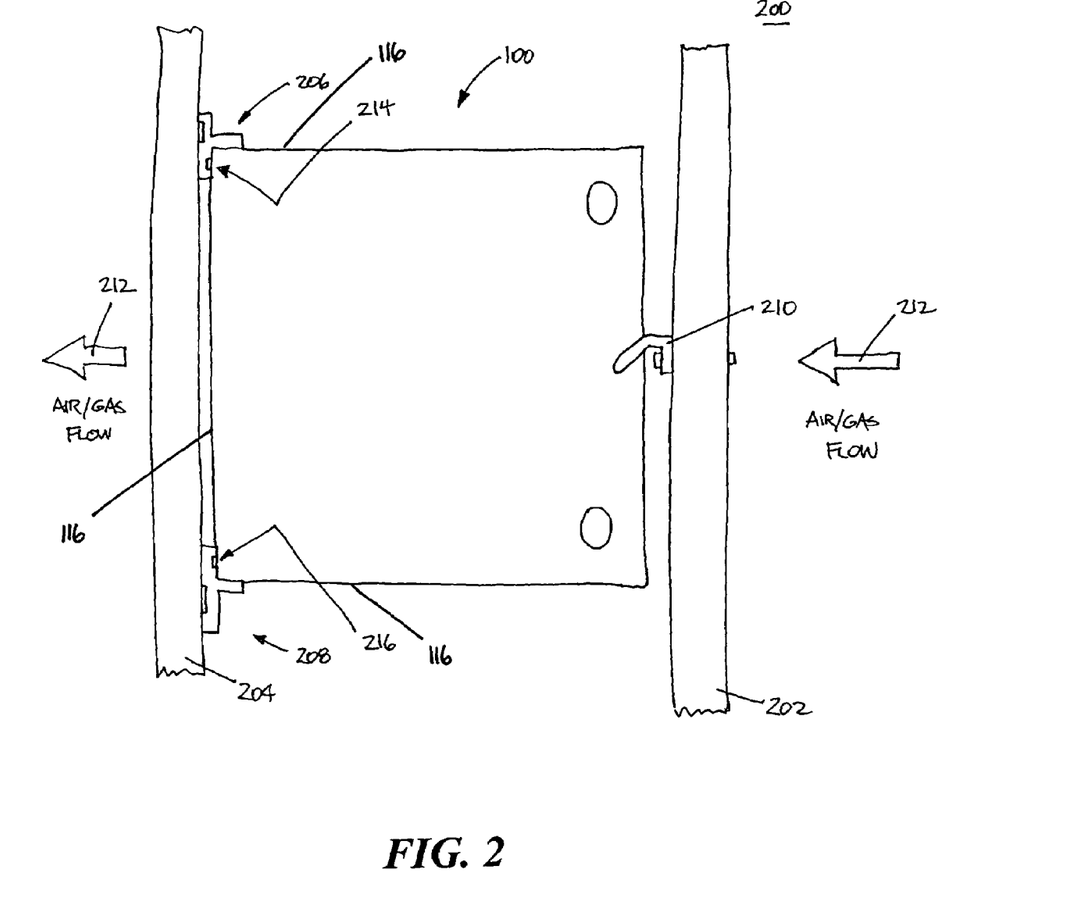
FIG. 2 is a side perspective view of an installation of the apparatus shown in FIG. 1.
Figure 3:
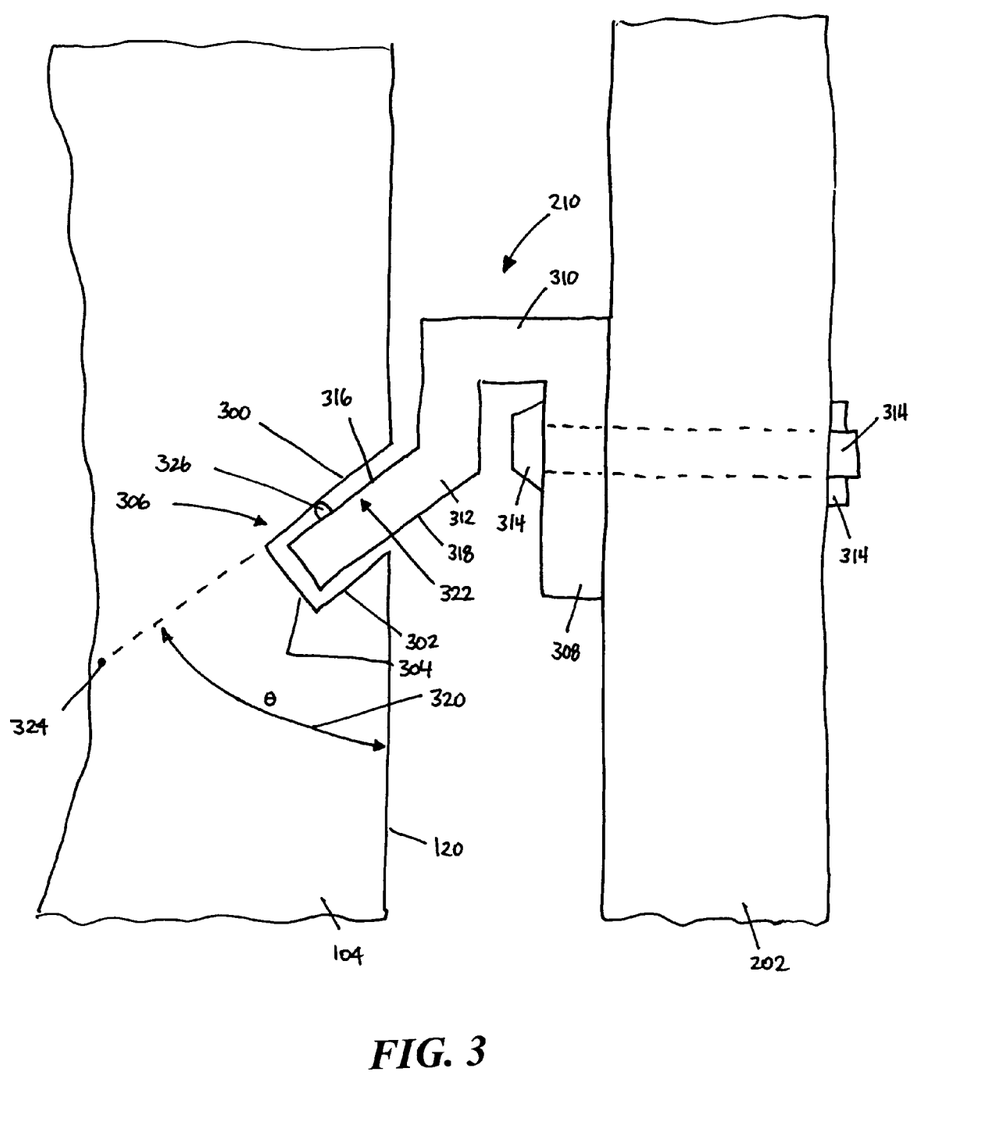
FIG. 3 is a detail view of a mounting notch and guide for the apparatus shown in FIG. 2.

For the embodiment shown in FIGS. 1-3, the environment is an air circulation system such as a filtration system with vertically-oriented structural components and an air flow. Other embodiments of the invention can operate in other configurations of air or gas circulation systems, filtration systems, ducts for air or gas flow, or different environments altogether. In most instances, the invention is embodied in a filter containing filtration media. However, the invention can be embodied in other types of components, housings, filters, containers, or instruments which are closely mounted to a structure associated with an air or gas circulation system, and where a load is subsequently placed upon the components, housings, filters, containers, or instruments causing a portion of the load to be transferred to the air or gas circulation system.

FIG. 1 is a perspective view of an exemplary apparatus in accordance with an embodiment of the invention. The apparatus is an air circulation component such as a filter 100, and is designed to be used with an air or gas filtration system and mounted with respect to an air or gas flow. The apparatus such as a filter 100 is also designed to contain a filtration media to remove contaminants from an air or gas flow.

The filter 100 shown includes a housing body 102 with sidewalls 104, 106. The sidewalls 104, 106 are positioned in parallel relation to each other, and adjacent to the housing body 102. In the embodiment shown, filtration media such as permanganate or Purafil®-brand adsorbant medium manufactured by Purafil, Inc. can be inserted or otherwise contained in the housing body 102 prior to installation of the filter 100. The housing body 102 is further configured to receive an air or gas flow at a leading end 108, and to permit the air or gas flow to pass through the filtration media towards a trailing end 110 of the body 102. Various configurations, shapes, and sizes of a housing body 102 and sidewalls 104, 106 can be utilized in accordance with other embodiments of the invention.

Each sidewall 104, 106 includes a respective mounting notch 112, gripping devices 114, and mounting brackets 116, 118. In the example shown, the mounting notch 112 in sidewall 104 is located at a leading edge 120 of the sidewall 104 and adjacent to the upper portion of the sidewall 104. Likewise, the mounting notch 112 in sidewall 106 is located at a leading edge 122 of the sidewall 106 adjacent to the upper portion of the sidewall 106. Each mounting notch 112 begins at the respective leading edge 120, 122 of each sidewall 104, 106, and angles downward toward the central portion of the respective sidewall 104, 106. The mounting notch 112 is sized to receive a portion of a guide (shown as 212 in FIG. 2). Cooperation between the mounting notch 112 and guide 212 is further described and shown in FIGS. 2 and 3 below. Other mounting notches can have other configurations, locations, sizes, shapes, or angles in accordance with various embodiments of the invention. Furthermore, greater or fewer mounting notches can be used in accordance with various embodiments of the invention.

The gripping devices 114 in each sidewall 104, 106 are positioned at the upper and lower portions of the respective sidewalls 104, 106, and adjacent to the leading edges of the sidewalls 104, 106. In the example shown, the gripping devices 114 are circular-shaped cutouts through the sidewalls 104, 106 that permit a user to put a portion of his or her hand (or a device to assist the hand) into the gripping devices 114 to exert a force on the sidewall 104, 106. Other gripping devices can have other configurations, locations, sizes, or shapes in accordance with various embodiments of the invention. Furthermore, greater or fewer gripping devices can be used in accordance with various embodiments of the invention.

The set of mounting brackets 116, 118 permits the sidewalls 104, 106 of the filter 100 to be mounted with respect to a corresponding set of structural brackets (shown as 206, 208 in FIG. 2) associated with a filtration system or duct for air or gas flow. In the example shown, the mounting brackets are thin strips that extend along the trailing edges of the sidewalls 104, 106, and also extend along a portion of the upper and lower sides of the sidewalls 104, 106. Cooperation between the mounting brackets 116, 118 and the structural brackets 206, 208 are shown and described in FIGS. 2 and 4 below. Other mounting brackets can have other configurations, locations, sizes, or shapes in accordance with various embodiments of the invention. Furthermore, greater or fewer mounting brackets can be used in accordance with various embodiments of the invention.

FIG. 2 is a side view of the apparatus shown in FIG. 1, and is shown installed with respect to a filtration system 200 and positioned to receive an air or gas flow. The filtration system 200 shown includes a set of structural components 202, 204 with previously installed structural brackets 206, 208 and a guide 210. The guide 210 is mounted adjacent to the leading structural component 202, and the structural brackets 206, 208 are mounted adjacent to the trailing structural component 204. The filter 100 shown is oriented with respect to the structural brackets 206, 208, and guide 210 such that sidewalls 102, 104 of the filter 100 are substantially parallel to a direction 212 of the air or gas flow associated with the filtration system 200. In this manner, filtration media contained within the filter 100 is positioned to facilitate filtration of air or gas flow from the filtration system 200, where the air flow is in the direction from the leading structural component 202 towards the trailing structural component 204.

In this example, the filter 100 can be installed by mounting the filter 100 between the structural brackets 206, 208 so that the guide 210 mounts adjacent to the corresponding mounting notch 108 of the filter 100. In this manner, a portion of the weight of the filter (and filtration media in the filter) is transferred to the guide 210 by contact with the mounting notch 108, and another portion of the weight of the filter (and filtration media in the filter) is transferred to the structural brackets 206, 208 by contact with the mounting brackets 116, 118. The cooperation between the mounting notch 112 and guide 210 causes the filter 100 to press tightly against the structural brackets 206, 208, thus increasing the sealing pressure between the filter 100 and the structural brackets 206, 208 associated with the trailing structural component 204. The increased sealing pressure reduces air leakage and air or gas bypass across the filter 100. Furthermore, the use of a guide 210 reduces the number of structural brackets needed since conventional filters are typically mounted with brackets in all four corners of the filter.

To further reduce air leakage, air or gas bypass, and/or pressure drop across the filter 100, seals 214, 216 can be mounted between the filter 100 and structural brackets 206, 208 associated with the structural components 202, 204. In the embodiment shown, the structural brackets 206, 208 each include a respective seal 214, 216 that extends between each sidewall 104, 106. Each seal 214, 216 is a strip that can be mounted mechanically or by an adhesive to the respective structural bracket 206, 208. When the filter 100 is installed with respect to the structural brackets 206, 208, the seals 214, 216 extend into some or all of the space between the filter 100 and the set of structural brackets 206, 208. In this example, the seals 214, 216 are pile seals or brush seals. Other types of seals or seals for a filter 100 can have other configurations, locations, shapes, or sizes in accordance with various embodiments of the invention.

In an alternative embodiment, seals are mounted to the filter 100 instead. The filter-mounted seals optimally extend into some or all of the space between the filter 100 and the set of structural brackets 206, 208. In this example, the seals are pile seals or brush seals. Other types of seals or seals for a filter 100 can have other configurations, locations, shapes, or sizes in accordance with various embodiments of the invention. Furthermore, greater or fewer seals can be used in accordance with various embodiments of the invention.

The filter 100 can be made from plastic, aluminum, steel, another durable material, or a combination thereof. One skilled in the art will recognize the types of materials that can be utilized for the various components of a filter in accordance with various embodiments of the invention.

Figure 4:
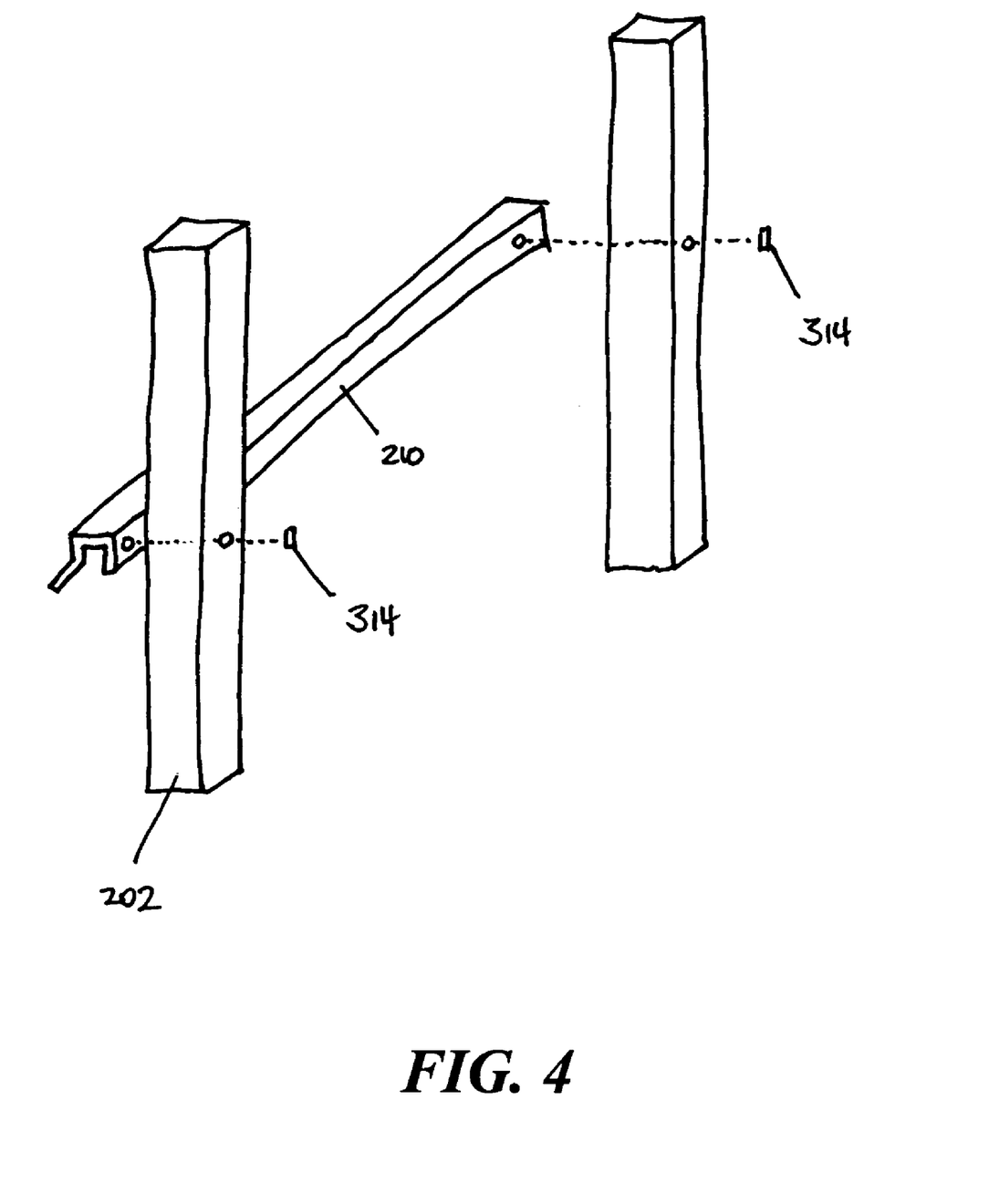
FIG. 4 is an exploded perspective view of a guide for the apparatus shown in FIG. 2.

FIG. 3 is a detail view of the mounting notch 112 and guide 210 for an apparatus shown in FIG. 2. FIG. 4 is an exploded perspective view of the guide 210 for an apparatus shown in FIG. 3 mounted adjacent to structural component 202. As shown in FIG. 3, the mounting notch 112 begins at the leading edge 120 of the sidewall 104, and angles downward from the leading edge 120 towards a lower portion of the sidewall 104. A corresponding mounting notch 112 on the opposing sidewall 106 has a similar configuration. The mounting notch 112 includes an upper side 300 and lower side 302 that are substantially parallel to each other, and the sides 300, 302 extend away from the leading edge 120 of the sidewall 104. The sides 300, 302 each terminate at a lower portion of the mounting notch 112, which in this case, is a squared off end 304. The upper side 300 of the notch 108 includes a relatively flat contact surface 306 that is adapted to be adjacent to a portion of the guide 210, and further adapted to transfer a portion of the weight of the filter (and filtration media in the filter) to the guide 210. The shape of the mounting notch 112 is shown by of example only, and can be other shapes including, but not limited to, a V-shape, a U-shape, or an irregular shape. Furthermore, the texture of the contact surface is shown by example only, and can be other textures including a series of edges, or a flat surface with one or more microbumps.

In the embodiment shown in FIGS. 3 and 4, the guide 210 spans the width of the filter 100. In other embodiments, the guide can be shorter or longer, or alternatively is configured into multiple sections. In any configuration, the guide 210 is oriented to contact at least one mounting notch 112 of the filter 100. The guide 210 shown includes a mounting portion 308, an intermediate portion 310, and an extended portion 312 that permits a close fit with the mounting notch 112. The mounting portion 308 of the guide 210 mounts to a side of the leading structural component 202 via a mounting device 314 such as a bolt and associated nut. The mounting device 314 secures the position of the guide 210 relative to the leading structural component 204, and transfers a portion of the weight of the filter (and filtration media in the filter) to the leading structural component 202 when the guide 210 is adjacent to the mounting notch 112. The intermediate portion 310 of the guide 210 extends between the mounting portion 308 and the extended portion 312 of the guide 210. The extended portion 312 includes an upper surface 316 and a lower surface 318 that are parallel to each other. The extended portion 312 extends away from the intermediate portion 310 at an angle that generally corresponds with a contact angle 320. The upper surface 316 includes a relatively flat load bearing surface 322 that is adapted to be in contact with the contact surface 306 of the mounting notch 108. The shape of the extended portion 312 is designed to closely fit within the shape of the notch 112 so that when the filter 100 is mounted adjacent to the structural brackets 204 206, a portion of the contact surface 306 is adjacent to a portion of the load bearing surface 322. The shape of the guide 210 is shown by of example only, and can be other shapes including, but not limited to, a V-shape, a U-shape, or an irregular shape. Furthermore, the texture of the load bearing surface is shown by example only, and can be other textures including a series of edges, or a flat surface with at least one microbump.

An imaginary line through the intersection of the contact surface 306 and load bearing surface 322 is referred to herein as the "contact angle" 320. The contact angle 320 is substantially coplanar to a center of gravity 324 of the filter 100, shown here by example only. The contact angle 320 shown is measured from the intersection of the contact surface 306 and load bearing surface 322 to the leading edge 120 of the sidewall 104. In this example, the center of gravity 324 of the filter 100 is defined as the center of gravity of the weight of the filter 100 and the filtration media in the filter 100.

In other embodiments, frictional movement of the filter 100 with respect to the guide 210 while the filter 100 is in use can increase or decrease the contact angle such that the intersection of the contact surface 306 and load bearing surface 322 is generally aligned towards the center of gravity 324 of the filter. In these embodiments, the contact angle 320 is also defined as being "substantially coplanar to a center of gravity of the filter."

In the embodiment shown in FIGS. 3 and 4, the load bearing surface 322 includes a microbump 326. The microbump 326 is a relatively small protrusion from the load bearing surface 322 that contacts the contact surface 306 when the guide 210 is fit within the mounting notch 112. The microbump 326 permits a portion of the force caused by the weight of the filter (and filtration media in the filter) to be concentrated on a particular point of the load bearing surface 324, permitting the guide 210 to slide along the microbump 326. The microbump 326 can be a molded piece integrated with the guide 320, or can be a piece of Teflon or other durable material mounted to the guide 210.

Therefore, when a portion of the contact surface 306 is adjacent to and in contact with a portion of the load bearing surface 322, a portion of the weight of the filter (and filtration media in the filter) is transferred from the contact surface 306 to the load bearing surface 322. A portion of the force generated by the weight of the filter (and filtration media in the filter) causes a force such as a sealing pressure to be generated by the filter 100 upon the structural brackets 206, 208 adjacent to the trailing edge 110 of the filter. The sealing pressure causes the filter 100 to press tightly against the structural brackets 206, 208 reducing the air leakage and air or gas bypass across the filter 100. The sealing pressure is further increased when an air or gas flow through the filter 100 is introduced in the air or gas flow direction.

In this example, the contact angle 320 affects the amount of sealing pressure of the filter 100 against the trailing structural component 204. When the contact angle 320 is oriented through a center of gravity of the weight of the filter (and filtration media in the filter), such as 324, and the filter is installed with respect to the guide 210 so that the mounting notch 112 is adjacent to the guide 210, the sealing pressure of the filter 100 against the trailing structural component can be maximized.

Figure 5:
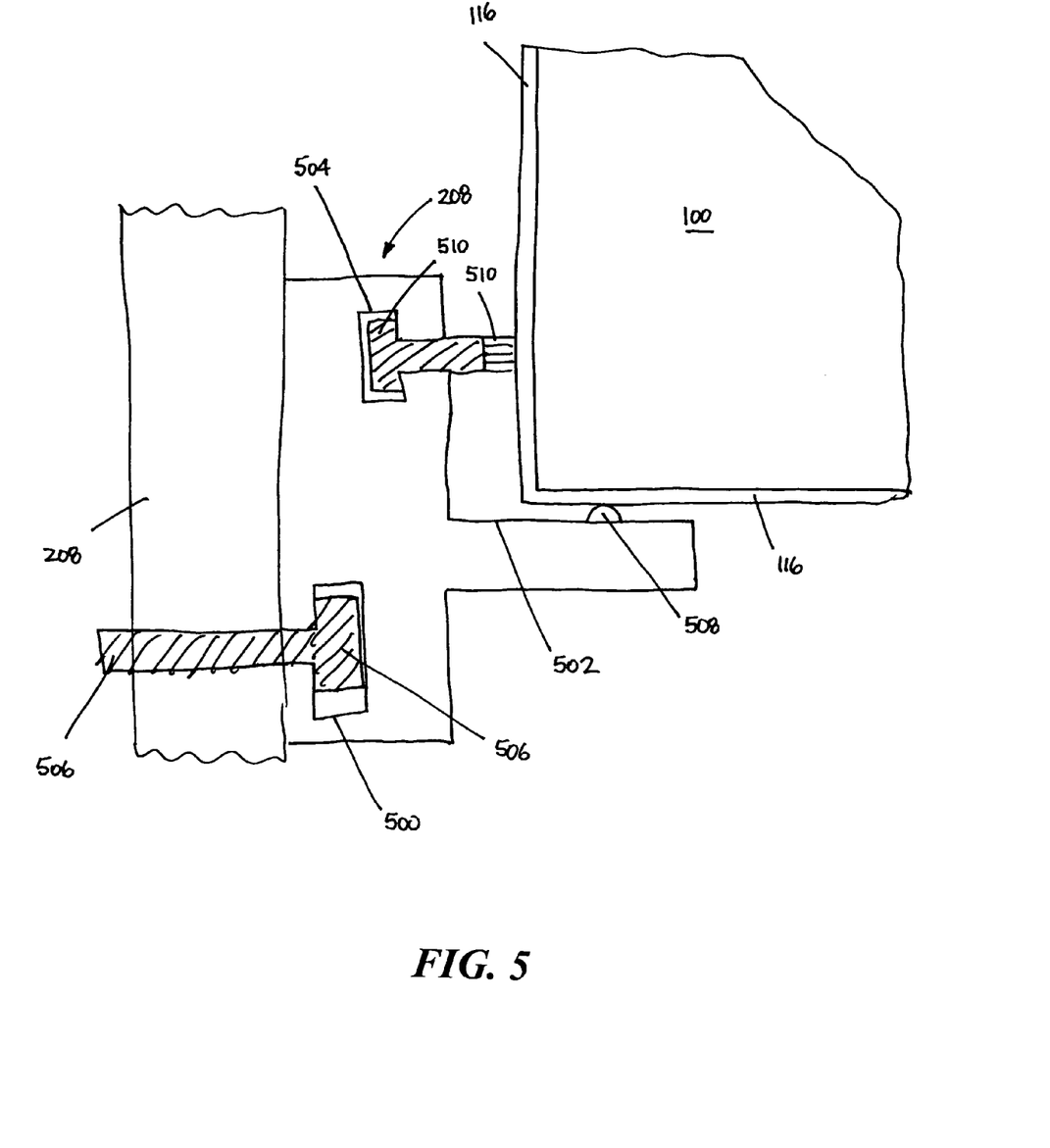
FIG. 5 is an exploded perspective view of a seal configuration for the apparatus shown in FIG. 2.

FIG. 5 is a detail view of a lower structural bracket configuration for the apparatus shown in FIG. 2. In this example, the lower structural bracket 208 is shown adjacent to the trailing structural component 204 and the apparatus such as filter 100. The upper structural bracket 206 has a similar shape as the structural bracket 208, but is a mirror image of the lower structural bracket 208. Similar to the configuration of the guide 210, the structural brackets 206, 208 span the width of the filter 100. Each structural bracket 206, 208 contacts a portion of a mounting bracket 116, 118 and/or portion of the filter 100 when the filter 100 mounts adjacent to the structural brackets 206, 208. In other embodiments, the structural brackets 206, 208 can be shorter or longer, or alternatively could be configured into multiple sections.

The structural bracket 208 shown includes a structural mounting track 500, an angle portion 502, and a seal mounting track 504. The structural mounting track 500 is shaped to receive a mounting device 506 such as a bolt. When at least one mounting device 506 such as a bolt is mounted to the trailing structural component 204, the structural mounting track 500 can mount to a portion of the mounting device 506 to secure the position of the structural bracket 208 relative to the structural component 204.

The angle portion 502 shown is shaped to receive a portion of the filter 100, such as the mounting bracket 116 and/or lower portion of the filter 100. When the filter 100 is mounted with respect to the lower structural bracket 208, a portion of the mounting bracket 116 is in contact with a part of the angle portion 502. The surface of the angle portion is relatively flat and smooth, and is shown by example only. In the embodiment shown, the angle portion 502 includes a microbump 508. The microbump 508 is a relatively small protrusion from the surface of the angle portion 502 that contacts the filter 100 when the filter 100 is fit within the angle portion 502. A microbump 508 can be a molded piece integrated with the angle portion 502, or can be a piece of Teflon or other durable material mounted to the angle portion 502. The microbump 508 permits a portion of the force caused by the weight of the filter (and filtration media in the filter) to be concentrated on a particular point of the angle portion 502, permitting the filter 100 to slide along the microbump 508. The surface of the angle portion can include other textures including, but without limitation, a series of edges, a flat surface, or a surface with multiple microbumps.

The seal mounting track 504 is shaped to receive a seal 510 such as a brush seal. The seal 500 can mount to the seal mounting track 504 via a corresponding mechanical device such as a track or an adhesive. When the seal 510 mounts within the seal mounting track 504, the seal 510 occupies some or all of space between the structural bracket 208 and the mounting bracket 116 and/or lower portion of the filter 100. In this manner, the seal 510 limits the air or gas leakage or bypass between the filter 100 and the structural bracket 208.

Figure 6:
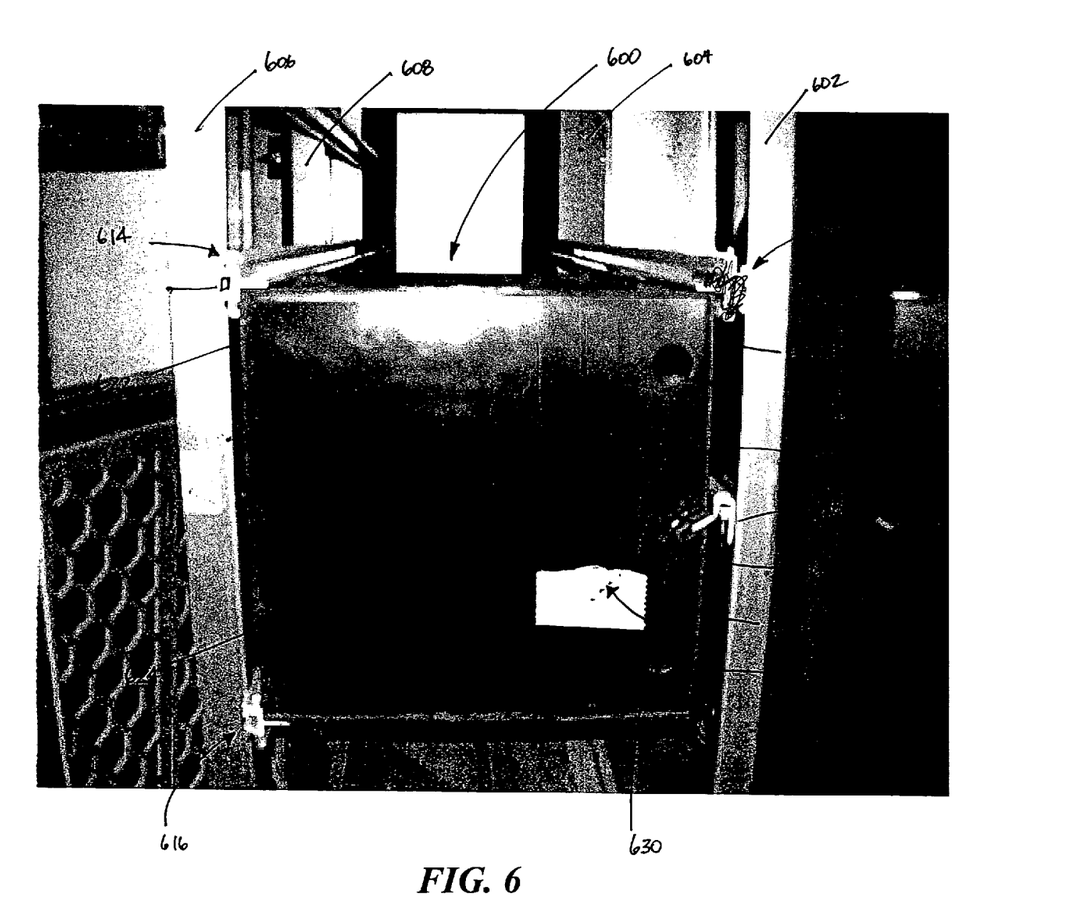
FIG. 6 is another embodiment of an apparatus in accordance with an embodiment of the invention.

FIG. 6 is another embodiment of an apparatus in accordance with an embodiment of the invention. In this embodiment, the apparatus such as a filter 600 is installed with respect to a set of vertically-oriented structural components 602, 604, 606, and 608 of a filtration system 610. Three structural brackets 612, 614, 616 and a guide 618 support the filter 600 with respect to the structural components 602, 604, 606, and 608. A structural bracket is respectively located near the upper leading edge 620, upper trailing edge 622, and lower trailing edge 624 of the filter 600. In this example, the guide 618 is located adjacent to the central portion of the leading edge 626 of the filter 600 between the upper leading edge 620 and lower leading edge 628. A corresponding mounting notch 630 in the filter 600 is located adjacent to the leading edge 626 of the filter 600 between the upper leading edge 620 and lower leading edge 628 of the filter 600. When the filter 600 mounts between the structural brackets 612, 614, 616 and the guide 618, the weight of the filter (and filtration media in the filter) and the cooperation between the guide 618 and mounting notch 630 causes the upper trailing edge 622 and lower trailing edge 624 of the filter 600 to press against the respective structural brackets 614, 616. In this manner, the sealing pressure of the filter 600 against the structural components 606, 608 increases and reduces air leakage and air or gas bypass across the filter 600.

In this example, a contact angle 632 may not be coplanar with a center of gravity of the filter (and filtration media in the filter), but nevertheless, the example shows an alternative orientation for a mounting notch 630 and guide 618, and resultant contact angle 632, in accordance with an embodiment of the invention.

Figure 7:
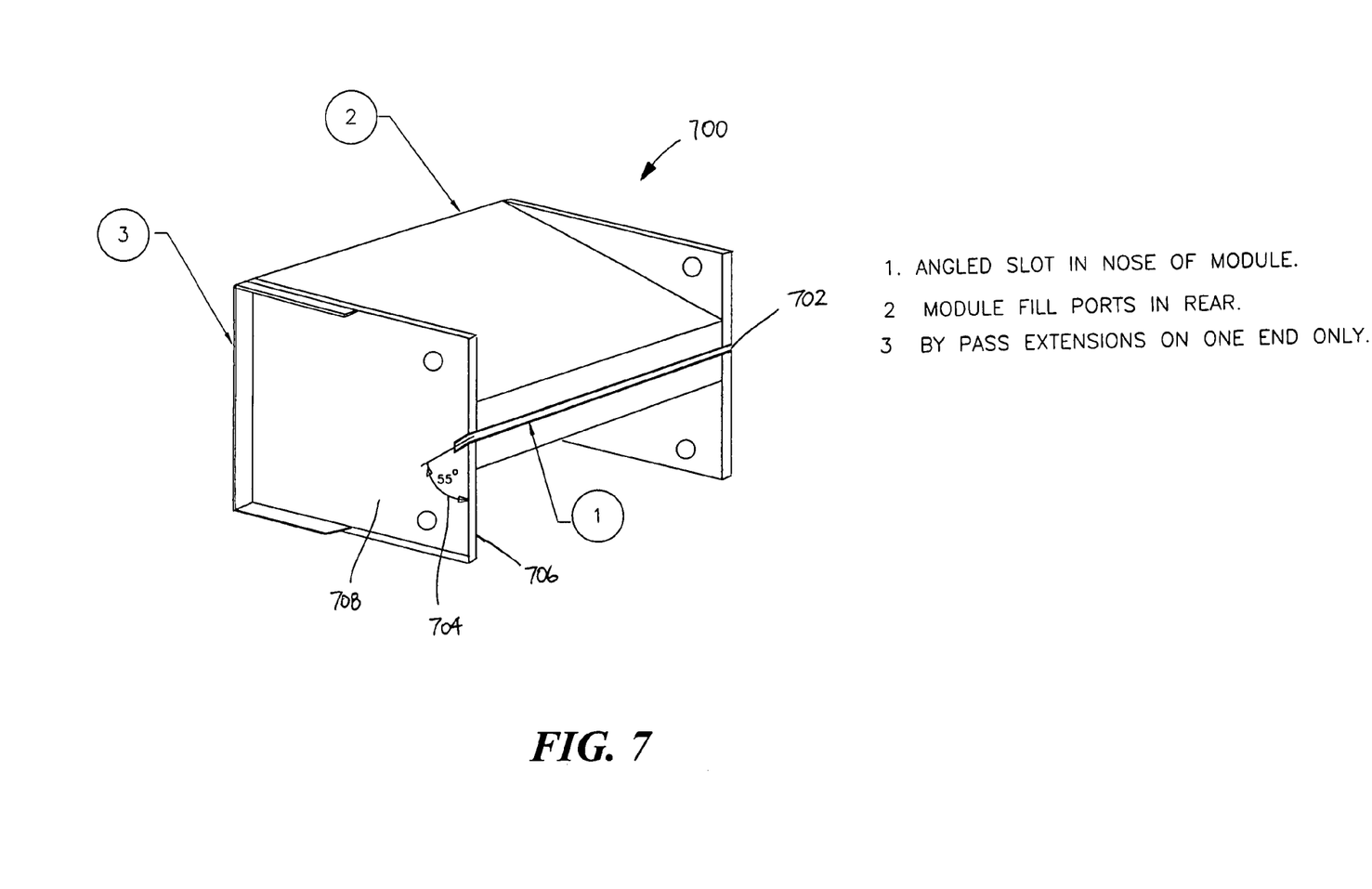
FIG. 7 is another embodiment of an apparatus in accordance with an embodiment of the invention.

FIG. 7 is another embodiment of an apparatus in accordance with an embodiment of the invention. In this example, the apparatus such as a filter 700 is shown with a mounting notch 702 with a contact angle 704 being approximately 55 degrees as measured to the leading edge 706 of a sidewall 708. Again, in this example, the contact angle 704 may not be coplanar with a center of gravity of the filter (and filtration media in the filter), but nevertheless, the example shows an alternative orientation for a mounting notch 702 and contact angle 704 in accordance with an embodiment of the invention.

Figure 8:
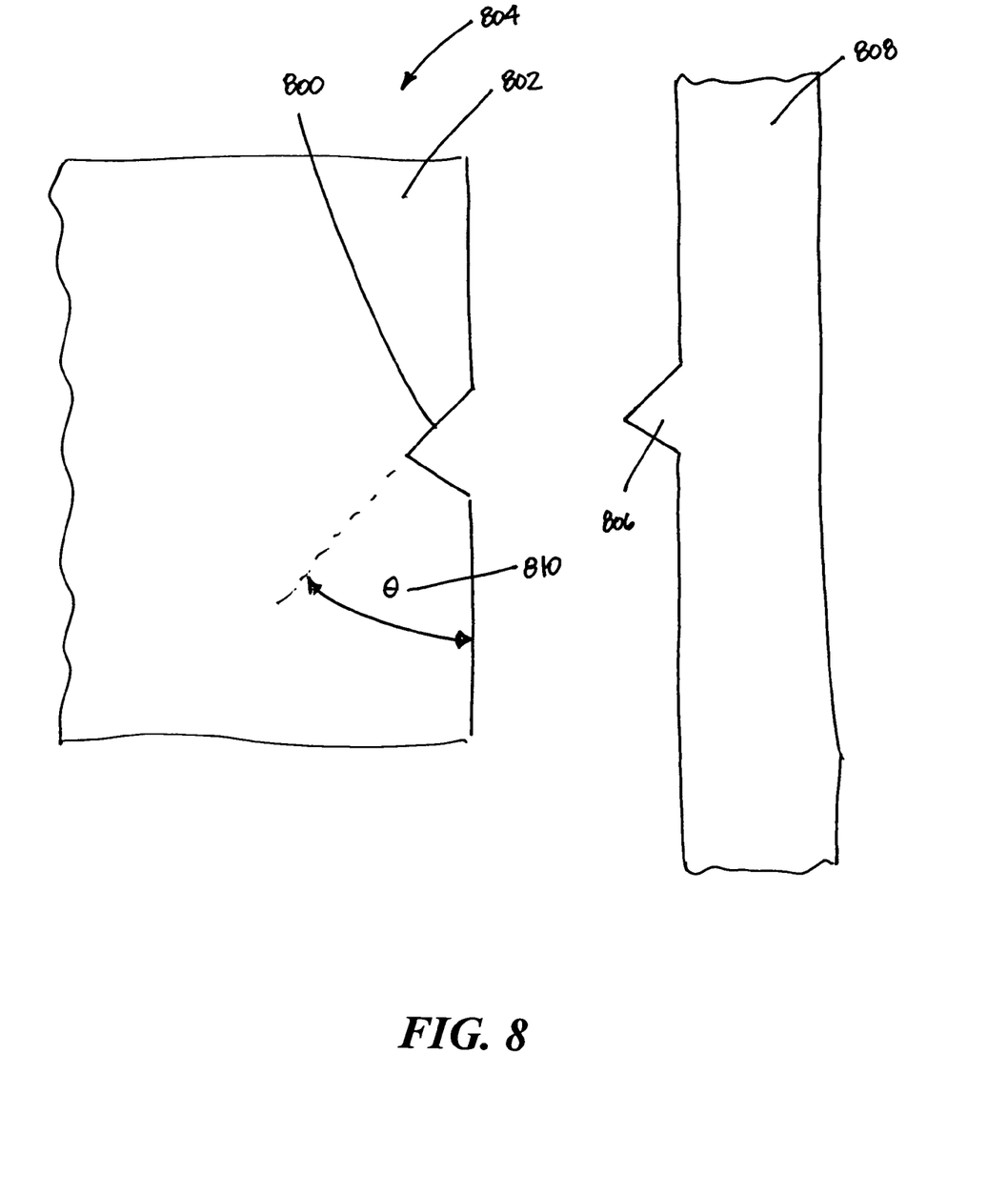
FIG. 8 is another embodiment of a mounting notch for an apparatus in accordance with an embodiment of the invention.

FIG. 8 is an embodiment of another mounting notch for a filter in accordance with an embodiment of the invention. In this example, a V-shaped mounting notch 800 in a sidewall 802 is shown for a filter 804. A corresponding guide 806 mounted to a leading structural component 808 is also shown. Similar to the embodiment described above in FIGS. 1-3, a contact angle 810 should be coplanar to a center of gravity of the filter (and the filtration media in the filter) to maximize the sealing pressure of the filter 802 against a trailing structural component. In other embodiments, similar to those shown in FIGS. 6 and 7, when the position of the mounting notch 800 is relatively higher or lower along the sidewall 802 than shown, the sealing pressure of the filter 800 against a trailing structural component can be adjusted. Furthermore, in other embodiments, additional mounting notches 800 in various locations along the sidewall 802 can be utilized to adjust the sealing pressure of the filter 800 against a trailing structural component. As described above, other sizes, shapes, and locations of mounting notches can be utilized in accordance with various embodiments of the invention.

Figure 9:
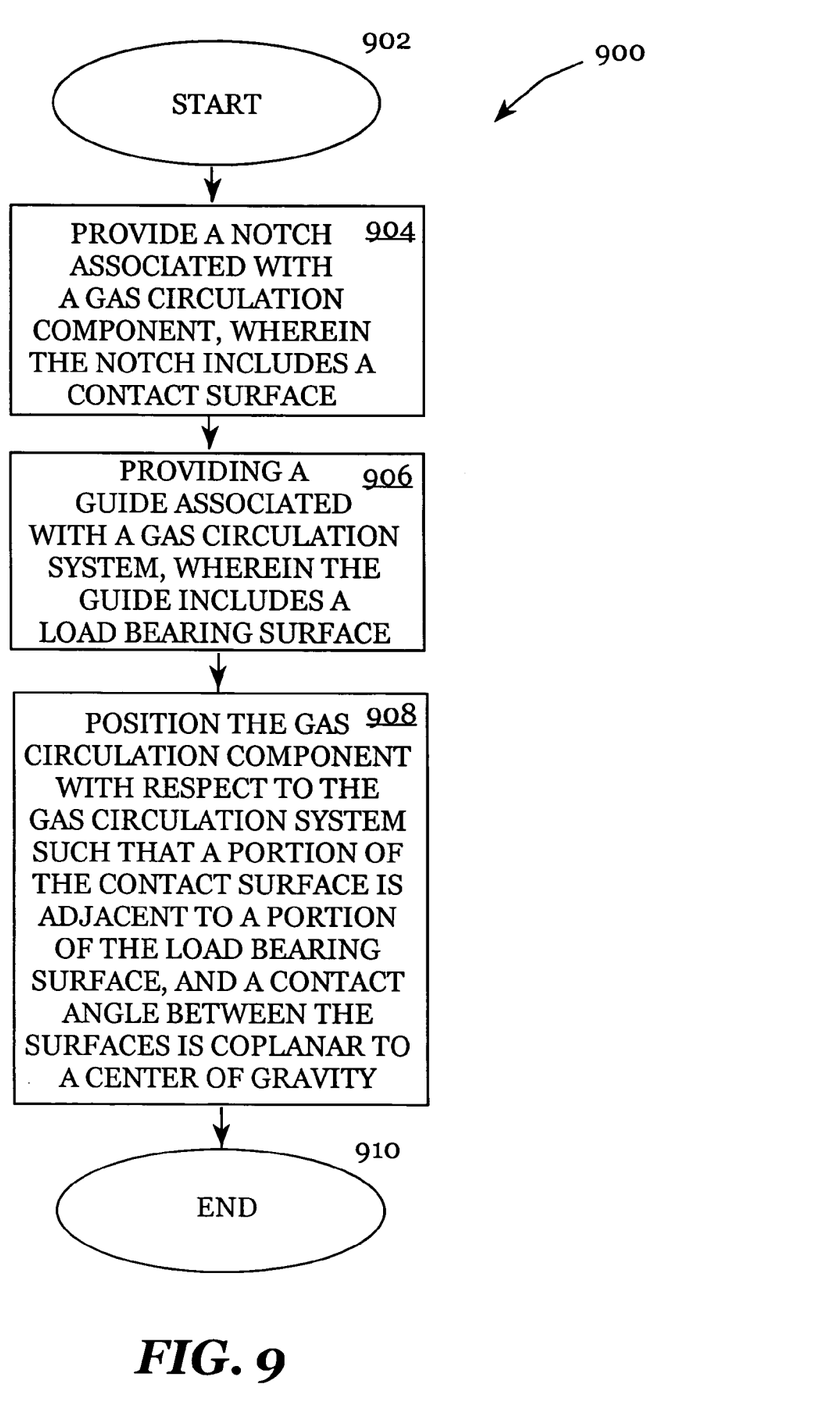
FIG. 9 is a flowchart illustrating an exemplary method in accordance with an embodiment of the invention.

FIG. 9 is a flowchart illustrating an exemplary method in accordance with an embodiment of the invention. The method 900 is for mounting an air circulation component such as a filter to an air circulation system such as a filtration system, in which the air circulation component includes a center of gravity. In this embodiment, the center of gravity of the air circulation component is center of gravity of the air circulation component with filtration media associated with the air circulation component. The exemplary method 900 shown here can be performed with the apparatus shown and described in FIGS. 1-3. Other apparatuses can be utilized with the method 900 in accordance with other embodiments of the invention.

In block 902, the method 900 begins.

Block 902 is followed by block 904, a notch associated with an air circulation component such as a filter is provided. In this embodiment, the notch includes a contact surface. As shown in FIG. 3, a filter 100 with a mounting notch 310 is provided with a contact surface 306.

Block 904 is followed by block 906, in which a guide associated with an air circulation system such as a filtration system is provided. In this embodiment, the guide includes a load bearing surface. As shown in FIGS. 2 and 3, a filtration system 200 with a guide 310 is provided with a load bearing surface 322.

Block 906 is followed by block 908, in which the air circulation component is positioned with respect to the air circulation system component such that a portion of the contact surface is adjacent to a portion of the load bearing surface. In this embodiment, the adjacent surfaces include a contact angle that is substantially coplanar with a center of gravity of the air circulation component, and a portion of the weight of the air circulation component causes a sealing pressure against a portion of the air circulation system. As shown in FIGS. 2 and 3, the contact surface 306 contacts the load bearing surface 322 to create a contact angle 320 that is substantially coplanar with a center of gravity 324 of the filter 100. A portion of the weight of the filter 100 causes the trailing edge or mounting bracket 116 of the filter 100 to press tightly against the structural brackets 206, 208.

Block 908 is followed by block 910, in which the method 900 ends.

It should be understood, of course, that the foregoing relates only to certain embodiments of the present invention and that numerous modifications or alterations may be made therein without departing from the scope of the invention.

What is claimed is:

1. A method for mounting a filter in a gaseous flow, comprising:
   providing first and second structural members in spaced-apart relation, said first structural member having a guide projecting therefrom and angled generally downward and toward said second structural member, and said second structural member having a support surface located thereon;
   providing a filter including a housing having opposed first and second sides, a slot formed in said first side of said filter housing and extending generally inward and downward, a load-bearing surface formed on said second side of said filter housing, and a filter medium supported by said filter housing; and
   engaging said filter with said first and second structural members such that said filter medium is disposed within said gaseous flow, said slot on said filter housing engaging said guide on said first structural member, and said load-bearing surface on said filter engaging said support surface on said second structural member, whereby said second side of said filter housing is biased against said second structural member.

2. The method of claim 1, wherein the guide comprises a microbump adapted to be in substantial contact with a portion of the contact surface.

3. The method of claim 1, wherein the slot comprises a microbump adapted to be in substantial contact with a portion of the load bearing surface.

4. The method of claim 1, further comprising the step of:
providing a seal between a portion of the filter housing and a corresponding portion of the second frame member.

5. The method of claim 4, wherein the seal is at least one of the following: a pile seal, and a brush seal.

6. The method of claim 1, further comprising:
providing a gripping device associated with the air circulation component.

7. The method of claim 6, wherein the gripping device comprises at least one of the following: at least one hole in the air filter, and an extension from the air filter.

8. The method of claim 1, wherein the air filter comprises at least one of the following: a structural bracket adjacent to a structural component of an air circulation system, a structural component of the air circulation system, a non-structural component of the air circulation system.

9. A filter for filtering a gaseous stream for mounting to first and second structural members, wherein said first structural member has a guide projecting therefrom and angled generally downward and toward said second structural member, and wherein said second structural member has a support surface located thereon, said filter comprising:
a filter housing having opposed first and second sides;
a slot formed in said first side of said filter housing and extending generally inward and downward, said slot being configured to receive said guide of said first structural member therein;
a load-bearing surface formed on said second side of said filter housing; and
a filter medium supported by said filter housing and disposed in said gaseous stream;
wherein when said slot formed in said first side of said filter housing engages said guide projecting from said first structural member, a portion of the weight of said filter housing bears against said guide, and said support surface located on said second structural member contacts said load-bearing surface formed on said second side of said filter housing;
whereby said portion of said weight of said filter housing bearing on said angled guide causes said second side of said filter housing to be biased against said second structural member.

10. The filter of claim 9, further comprising a microbump extending into said slot.

11. The filter of claim 9, further comprising: a seal located on said second side of said filter housing and positioned such that when said filter is mounted on said first and second structural members, said seal engages said second structural member.

12. The filter of claim 11, wherein the seal is at least one of the following: a pile seal, or a brush seal.

13. The filter of claim 9, further comprising:
a gripping device associated with the housing.

14. The filter of claim 13, wherein the gripping device comprises at least one of the following: at least one hole in the housing, and an extension from the housing.

15. An apparatus for filtering a gaseous flow, comprising:
first and second structural members in spaced-apart relation;
a guide projecting from said first structural member and angled generally downward and toward said second structural member;
a support surface located on said second structural member;
a filter housing having opposed first and second sides;
a slot formed in said first side of said filter housing and extending generally inward and downward;
a load-bearing surface formed on said second side of said filter housing; and
a filter medium supported by said filter housing and disposed in a gaseous flow to be filtered;
wherein said guide projecting from said first structural member engages said slot formed in said first side of said filter housing such that a portion of the weight of said filter housing bears against said guide;
wherein said load-bearing surface formed on said second side of said filter housing contacts said support surface located on said second structural member; and
wherein said portion of said weight of said filter housing bearing on said angled guide causes said second side of said filter housing to be biased against said second structural member.

16. The apparatus of claim 15, further comprising means for directing said gaseous flow generally transverse to said first and second frame members.

17. The apparatus of claim 15, wherein said apparatus comprises a center of gravity, and wherein said slot defines an axis passing generally through said center of gravity.

18. The apparatus of claim 15, further comprising a microbump extending into said slot.

19. The apparatus of claim 15, further comprising a seal located on said second side of said filter housing and positioned such that when said filter is mounted on said first and second structural members, said seal engages said second structural member.

20. The apparatus of claim 19, wherein the seal is at least one of the following: a pile seal, or a brush seal.

21. The apparatus of claim 15, further comprising a gripping device associated with the housing.

22. The apparatus of claim 21, wherein the gripping device comprises at least one of the following: at least one hole in the housing, and an extension from the housing.

* * * * *